(12) United States Patent
Kawada et al.

(10) Patent No.: US 6,222,977 B1
(45) Date of Patent: Apr. 24, 2001

(54) OPTICAL CABLE INTRODUCING STRUCTURE AND METHOD OF INTRODUCING AND CONNECTING AN OPTICAL CABLE

(75) Inventors: Kouichi Kawada; Yasuhiro Kitajima; Hiroyuki Takahashi; Toshihide Nagasawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,294

(22) Filed: Jan. 28, 1999

(30) Foreign Application Priority Data

Jan. 29, 1998 (JP) .................................. 10-016922
Apr. 20, 1998 (JP) .................................. 10-109917

(51) Int. Cl.$^7$ ........................................... G02B 6/00
(52) U.S. Cl. ........................................ 385/136; 385/139
(58) Field of Search .................. 385/134–139, 385/88–94

(56) References Cited

U.S. PATENT DOCUMENTS 4,684,210 * 8/1987 Matsunaga et al. .................. 385/88

FOREIGN PATENT DOCUMENTS

| 61-48682 | 10/1986 | (JP) . |
| 62-30203 | 2/1987 | (JP) . |
| 63-8607 | 1/1988 | (JP) . |
| 3-191303 | 8/1991 | (JP) . |
| 5-43103 | 6/1993 | (JP) . |
| 7-218792 | 8/1995 | (JP) . |
| 10-54912 | 2/1998 | (JP) . |

* cited by examiner

Primary Examiner—Phan T. H. Palmer
(74) Attorney, Agent, or Firm—Scully, Scott, Murphy & Presser

(57) ABSTRACT

A structure for introducing an optical cable into a communication apparatus includes an adapter (3) to be affixed to a side wall (21) forming a part of the casing (2) of the apparatus. A case (4) is fitted in a bore axially extending throughout the center of the adapter (3). A ring nut assembly (5) holds an optical cable (6) at its center and is connected to the adapter (3) in such a manner as to cover the case (4). The cable (6) includes a tension merber (61) introduced into the casing (2) via the case (4) and adapter (3) and affixed by a tension member affixing portion (46) disposed in the casing (2). In this condition, the cable (6) is firmly affixed by the ring nut assembly (5) and tension member affixing portion (46), i.e., at two points. The fibers of the cable (6) are therefore free from breakage ascribable to a twisting force or a pulling force.

41 Claims, 16 Drawing Sheets

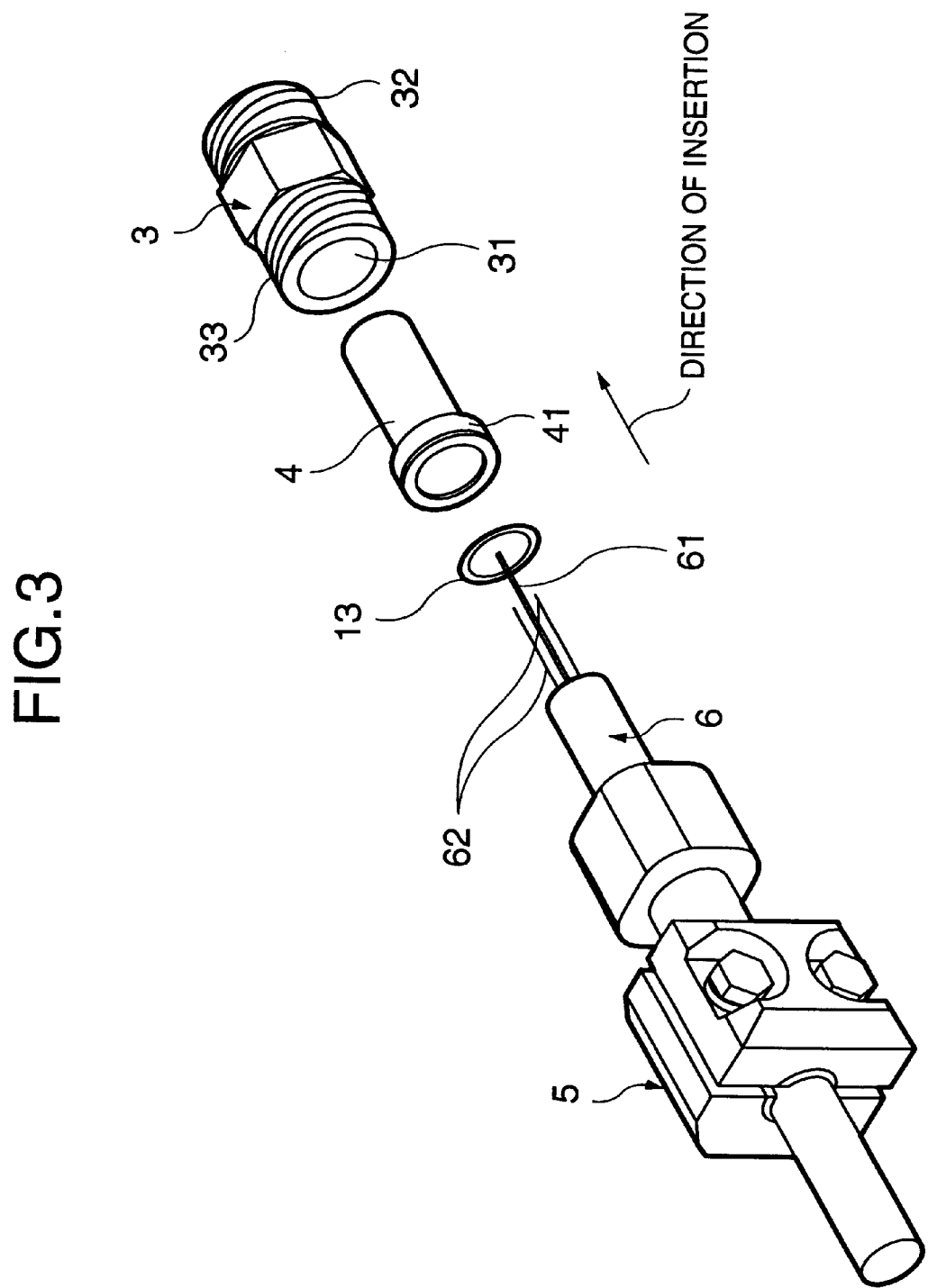

OPTICAL CABLE INTRODUCING STRUCTURE AND METHOD OF INTRODUCING AND CONNECTING AN OPTICAL CABLE

BACKGROUND OF THE INVENTION

The present invention relates to a communication apparatus of the kind having an optical cable introduced thereinto and more particularly to a structure and a method for the introduction of an optical cable into an outdoor communication apparatus.

While an optical cable is capable of transmitting a greater amount of data than a coaxial cable, its structure lacks in mechanical strength. In a communication network, optical cables are connected to a main line. The low mechanical strength of the cables themselves is particularly problematic at portions where the cables are connected to communication apparatuses, and has critical influence on the entire network. Such connecting portions should therefore be provided with high reliability and high quality.

It is a common practice to introduce an optical cable into a communication apparatus by using any one of four different structures, i.e., a simple clamp structure (first structure hereinafter), a simple water-proof affixing structure using a self-expanding tape (second structure hereinafter), a closure structure (third structure hereinafter), and an outdoor connecting structure (fourth structure hereinafter). These conventional structures have some problems left unsolved, as follows.

The first structure includes claws, which are raised to catch the sheath of an optical cable. The claws are apt to damage the sheath and allow water to enter the apparatus via the sheath. Further, the first structure uses a compressible tubular rubber packing for a waterproofing purpose. This brings about a problem that the tubular rubber packing strongly compressed causes creases to appear between it and the cable or that loads acting on the rubber packing over a long period of time cause the packing to crack. The creases and cracks produce clearances between the cable and the rubber packing, deteriorating the waterproofing ability of the structure. This problem is particularly serious when the cable has a small diameter.

In the second structure, after a self-expanding tape has been wrapped around an optical cable, the cable is inserted into a hole. In this condition, the tape fills a gap between the cable and the edge of the hole due to its own elasticity. However, such a simple waterproof scheme does not work over a long period of time because the tape is deteriorated due to aging. Moreover, the twist or the bend of the cable is directly imparted to the inside of the apparatus and likely to damage optical fibers existing in the apparatus.

The third structure introduces an optical cable into a closure. With this structure, it is necessary to increase the mounting area of an introducing portion within the apparatus.

In the fourth structure, a connector and a clamp are provided in a pair in matching relation to the diameter of an optical cable. This structure therefore needs a great number of different cable introducing portions each matching with a particular cable diameter and lacks in general-purpose applicability.

Generally, optical cables with great outside diameters are used for main lines transmitting a great amount of data while optical cables with small outside diameters are used for terminal lines transmitting a small amount of data. Further, the outside diameter of an optical cable depends on the manufacturer. Therefore, when the cable facilities are moved or varied, the above conventional structures require all the cable facilities to be replaced.

The fourth structure has a problem that when an optical cable is mounted or replaced or when an optical fiber mounted in a connector must have its radius of curvature adjusted, the entire cable introducing portion must be disassembled. This obstructs efficient operation and maintenance. Another problem is that the structure simply affixes a tension member protruding from the cable. In this condition, vibration ascribable to, e.g., winds causes the cable to twist or bend, twisting or pulling or, in the worst case, breaking optical fibers disposed in the connector. A further problem is that the connector cannot be reduced in size because the support of the tension member, the splice of the cable and the bend of the fibers to more than a prescribed radius of curvature (radius R greater than 30 mm) are effected within the connector.

The prerequisites with the introduction of an optical cable into a communication apparatus are as follows. The cable should be held by a force great enough to withstand tensile forces, moments and twists ascribable to, e.g., vibration caused by strong winds or pulling forces, which may accidentally, act on the cable. A sure waterproof implementation must be provided in order to prevent, e.g., rainwater from entering the apparatus via clearances between the apparatus and the cable when the cable is replaced with a cable having a different diameter.

It has also been customary to use a connector consisting of a plug and a receptacle for introducing an optical cable into a communication apparatus. However, this kind of scheme is not reliable from the standpoint of waterproof, tensile strength and electrical characteristic. Further, the connector is expensive. It is therefore desirable to directly introduce an optical cable into a communication apparatus.

SUMMARY OF THE INVENTION

It is therefore an object of the present invention to provide a new optical cable introducing structure which is small size, desirable in water-proof, maintenance and general-purpose applicability, and frees an optical cable from damage, and an optical cable connecting method for the same.

It is another object of the present invention to provide a new optical cable introducing structure capable of adapting itself to optical cables having different diameters while facilitating the replacement of such optical cables, and an optical cable connecting method for the same.

It is still another object of the present invention to provide a new optical cable introducing structure surely preventing an optical cable from being damaged, and an optical cable connecting method for the same.

It is a further object of the present invention to provide a new optical cable introducing structure capable of obviating a dead space existing in the casing of a conventional communication apparatus and promoting the efficient use of a limited space available in the casing to thereby miniaturize the apparatus, and an optical cable connecting method for the same.

In accordance with the present invention, in a structure for introducing an optical cable into the casing of a communication apparatus, an optical cable is affixed at at least two positions. In a preferred embodiment, the cable is affixed at at least two positions outside of the casing of the apparatus.

The above cable is affixed at at least one position by means for affixing the cable itself and at at least another position by means for affixing a tension member included in the cable.

In a preferred embodiment, the structure includes an adapter to be mounted to the casing while holding the cable at its center, a ring nut assembly connected to the adapter while holding the cable at its center, and a case intervening between the ring nut assembly and the adapter. Specifically, a plurality of cases identical in outside diameter, but different in inside diameter, are prepared and selectively used in accordance with the outside diameter of the cable.

In a preferred embodiment, means for affixing the tension member of the cable is positioned outside of the casing of the apparatus. Such tension member affixing means may be included in the case, in which case the case will be implemented as a case assembly.

The structure including the adapter, ring nut assembly and case is applied to an outdoor communication apparatus.

BRIEF DESCRIPTION OF THE DRAWINGS

The above and other objects, features and advantages of the present invention will become apparent from the following detailed description taken with the accompanying drawings in which:

FIG. 3 is an exploded perspective view of the first embodiment;

DETAILED DESCRIPTION OF THE PREFERRED EMBODIMENT

Figure 1:
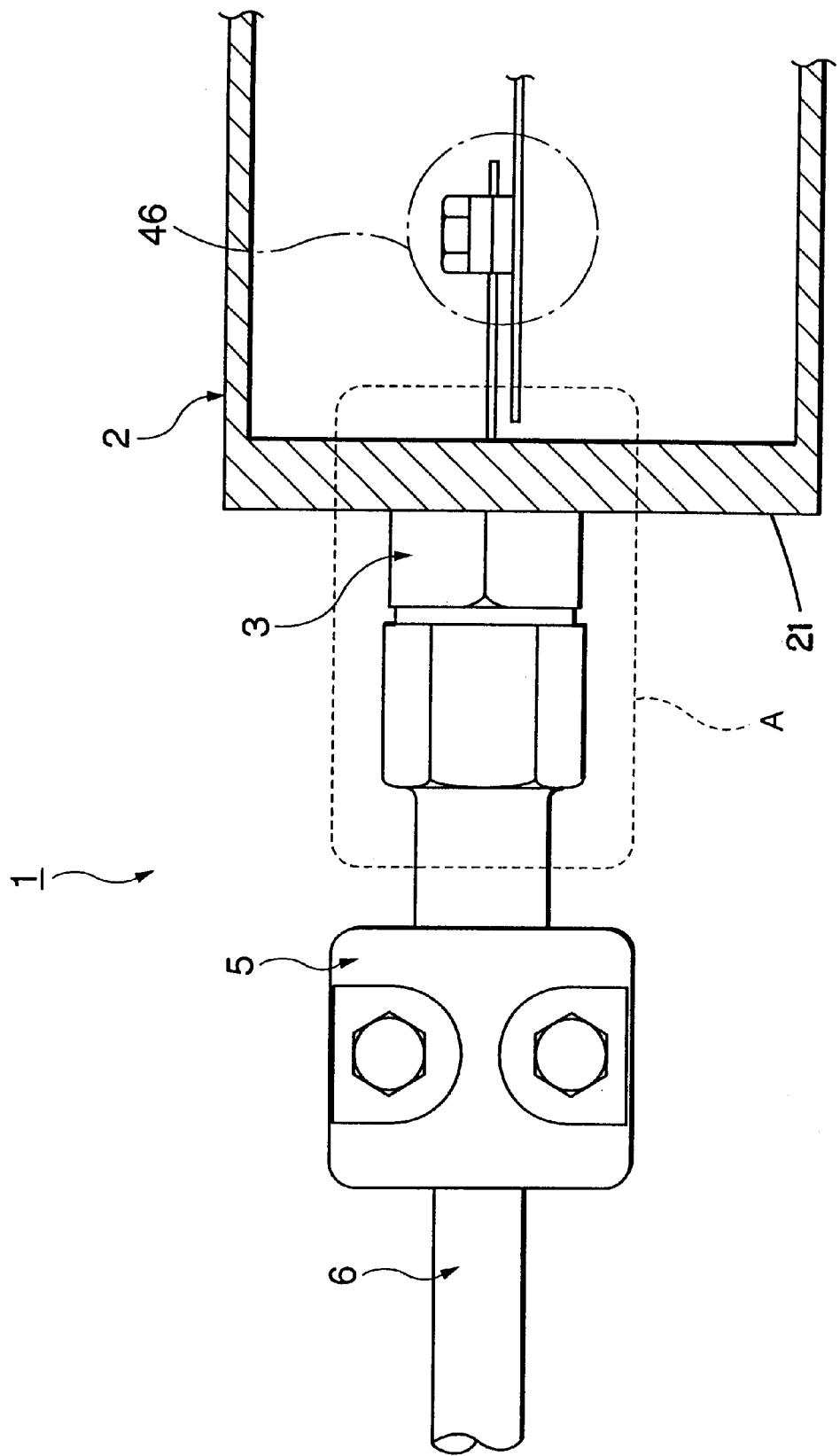
FIG. 1 is a front view showing a first embodiment of the optical cable introducing structure in accordance with the present invention.
Figure 2:
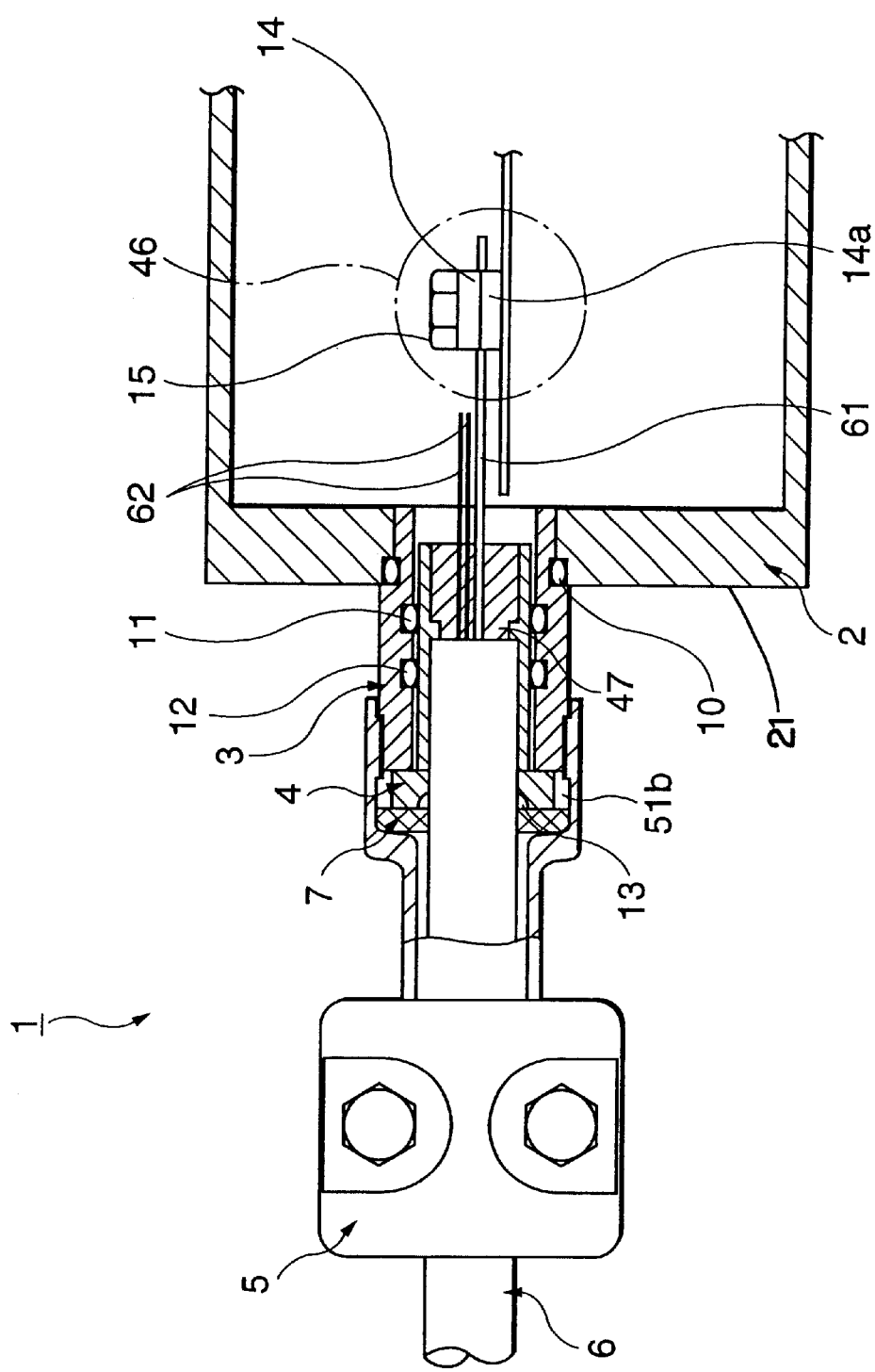
FIG. 2 shows a part A included in the first embodiment of FIG. 1 in a section.

Referring to FIGS. 1–3, a first embodiment of the optical cable introducing structure in accordance with the present invention is shown. As shown, the structure includes an adapter 3 screwed into a sidewall 21 forming a part of the casing of a communication apparatus. A case 4 positions an optical cable 6 while serving as a waterproof member. A ring nut assembly 5 introduces the cable 6 while holding it. A tension member affixing portion 46 affixes a tension member 61 included in the cable 6.

Figure 4A:
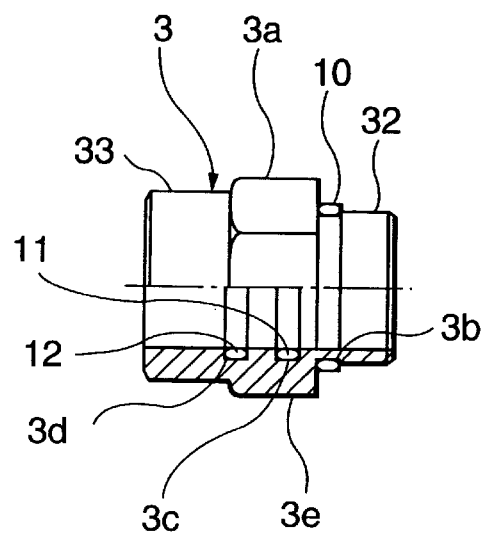
FIGS. 4A and 4B are respectively a partly sectional front view and a side elevation showing an adapter included in the first embodiment in detail.
Figure 4B:
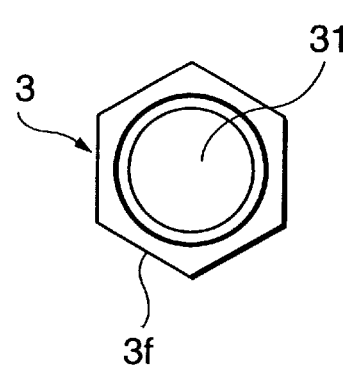

FIGS. 4A and 4B show the adapter 3 in detail. As shown, the adapter 3 is made up of a hollow cylindrical portion 3a, a first O-ring 10, and second O-rings 11 and 12. The cylindrical portion 3a is formed of brass, stainless steel, aluminum or similar metal or plastics. The O-rings 10, 11 and 12 are formed nitric rubber, silicone rubber, fluorine rubber or similar elastic material.

A hole 31 extends throughout the center of the cylindrical portion 3a. A first connecting portion (male screw) 32 and a second connecting portion (male screw) 33 are respectively formed at opposite ends of the cylindrical portion 3a. A first annular groove 3b is formed in the outer periphery of the cylindrical portion 3a. A plurality of second annular grooves, e.g., two grooves 3c and 3d are formed in the inner periphery of the cylindrical portion 3a.

The first connecting portion 32 is screwed into the casing 2 of the apparatus. The second connecting portion 33 mates with a female screw 51a (see FIG. 6B) formed in the inner periphery of an adapter connecting portion 51 included in the ring nut assembly 5.

The first O-ring 3b is received in the first groove 10 for preventing water from entering the casing 2 via the adapter 3. The second O-rings 11 and 12 are respectively received in the second grooves 3c and 3d in order to fill a clearance between the adapter 3 and the casing 4, also preventing water from entering the casing 4.

As shown in FIG. 4B, the adapter 3 has a hexagonal, dodecagonal or similar polygonal outer periphery 3f for facilitating the screwing of the adapter 3 into the casing 2.

Figure 5A:
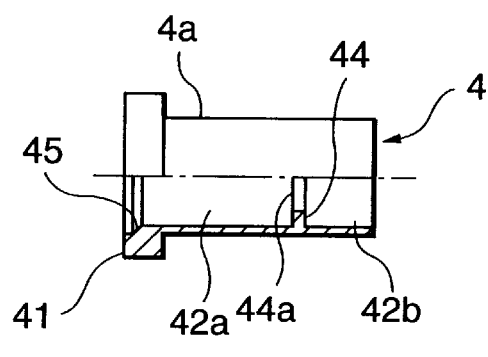
FIGS. 5A and 5B are respectively a partly sectional front view and a side elevation showing a case also included in the first embodiment in detail.
Figure 5B:
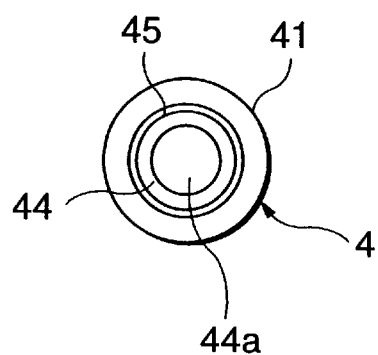

As shown in FIGS. 5A and 5B, the case 4 includes a hollow cylindrical portion 4a and a flange 41 and is formed of brass, stainless steel, aluminum or similar metal or plastics. The cylindrical portion 4a has an outside diameter capable of being received in the inside diameter of the adapter 3 shown in FIGS. 4A and 4B.

A bore 42 extends along the center of the cylindrical portion 4a. An annular cable stopper 44 is formed on the wall of the bore 42 and divides the inside of the cylindrical portion 4a into a first space 42a and a second space 42b in the axial direction of the case 4. A hole 44a is formed at the center of the cable stopper 44 for receiving the tension member 61 and optical fibers of the cable 6. The first space 42a accommodates the cable 6 while the cable stopper 44 prevents the cable 6 from entering the casing 2. The second space 42b is filled with a sealing material, e.g., epoxy resin or acrylic resin in order to intercept a small amount of water and air which may enter the case 4 via the cable 6.

A tapered annular groove 45 is formed in the flange 41 of the case 4. A third O-ring 13 (see FIGS. 2 and 3) is received in the tapered groove 45 and formed of nitric rubber, silicone rubber, fluorine rubber or similar elastic material. The O-ring 13 fills the gap between the case 4 and the cable 6 for a waterproofing purpose.

Figure 6A:
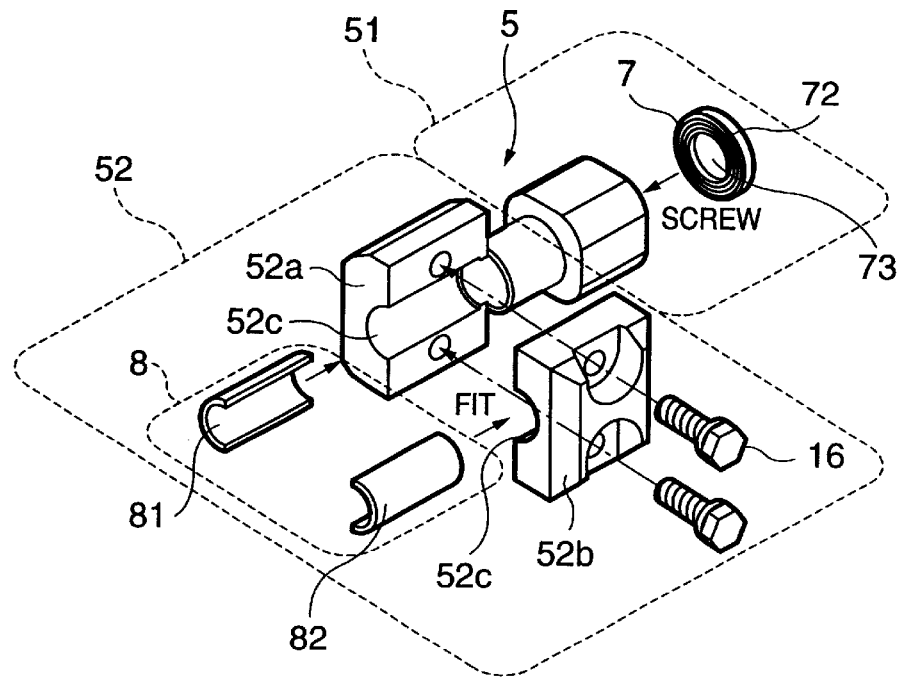
FIGS. 6A and 6B are respectively an exploded perspective view and a partly sectional front view showing a ring nut assembly further included in the first embodiment.

As shown in FIG. 6A, the ring nut assembly 5 is generally made up of the previously mentioned adapter connecting portion 51 and a cable holding portion, or second cable holding portion, 52.

Figure 6B:
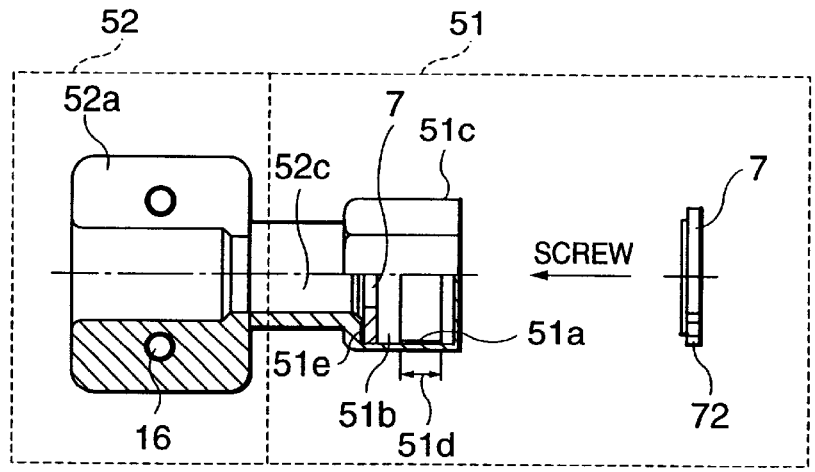
Figure 6C:
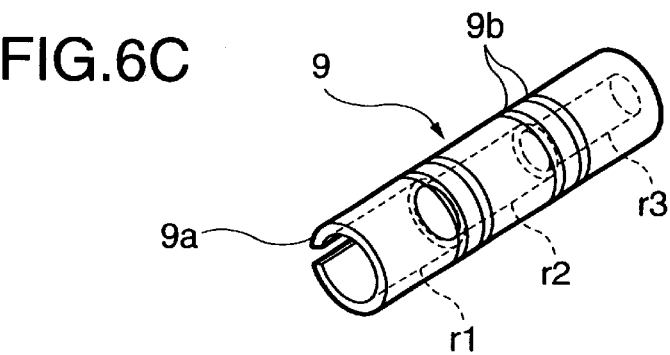
FIG. 6C is a perspective view of a general-purpose packing applicable to the assembly shown in FIGS. 6A and 6B.

The cable holding portion 52 includes a clamp support 52a, a clamp plate 52b, bolts 16, and either one of an exclusive packing 8 and a general-purpose packing 9 shown in FIG. 6c. The clamp support 52a and clamp plate 52b sandwich the cable 6 on which the packing 8 or 9 is mounted. The bolts 16 fasten the clamp plate 52b to the clamp support 52a. The clamp support 52a, clamp plate 52b and packing 8 or 9 each has an axial length great enough to absorb extraneous forces apt to act on the cable 6.

The exclusive packing 8 is made up of a first packing piece 81 and a second packing piece 82 produced by axially bisecting a cylinder having an inside diameter matching with the outside diameter of the cable 6. The exclusive packing 8 is exclusively applicable to the cable 6 used.

As shown in FIG. 6C, the general-purpose packing 9 is a hollow cylindrical packing whose inside diameter is not dependent on the outside diameter of the cable 6. Specifically, the packing 9 has a plurality of stepwise inside diameters, e.g., inside diameters r1, r2 and r2 in its axial direction. An axial slit 9b is formed in the packing 9 in order to mount the packing 9 to the cable 6. Slits 9b are formed in the packing 9 in the circumferential direction at positions where the inside diameter of the packing 9 changes. The packing 9 may be cut off at one of the circumferential slits 9b matching with the outside diameter of the cable 6.

As shown in FIG. 6B, the adapter connecting portion 51 includes a through bore 52c for receiving the cable 6 and a ring 7. The through bore 52c allows the cable 6 to be passed therethrough and has the female screw 51a mentioned earlier and a ring receiving portion 51a adjoining the female screw 51b. The female screw 51a is formed in the inner periphery of a first end included in the connecting portion 51 and mates with the adapter 3. The ring 7 is loosely fitted in the ring receiving portion 51b. The connection portion 51 has a polygonal outer periphery 51c so as to be easily connected to the adapter 3. A hole 73 is formed at the center of the ring 7 for passing the cable 6 therethrough and has an inside diameter matching with the outside diameter of the cable 6. A male screw 72 is formed in the outer periphery of the ring 7. With the male screw 72, the ring 7 is screwed into the effective thread range 51d of the female screw 51a and further driven until it has been loosely fitted in the ring receiving portion 51b.

The ring receiving portion 51b has an inside diameter slightly greater than the outside diameter of the ring 7 and includes a press wall 51e. As shown in FIG. 2, when the adapter connecting portion 51 is connected to the adapter 3, the press wall 51e presses the third ring 13 against the wall of the tapered groove 45 and thereby stops the gap between the O-ring 13 and the tapered groove 45. It is necessary that the ring 7 be strong and thick enough to press the O-ring 13 against the tapered groove 45.

The tension member affixing portion, or first cable affixing means, 46 is disposed in the casing 2. As shown in FIG. 2, the affixing portion 46 is made up of a bolt 15, and a metal piece 14 and a plate 14a cooperating to press the tension member 61.

How the above optical cable introducing structure is assembled will be described with reference to FIGS. 8A–8E as well as to FIGS. 1–7. First, as shown in FIG. 8A, the exclusive packing 8 whose inside diameter matches with the outside diameter of the cable 6 or the general-purpose packing 9, not shown in FIG. 8A, cut off in matching relation to the cable 6 is mounted to the clamp support 52a and clamp plate 52b. The ring 7 matching with the outside diameter of the cable 6 is screwed into the adapter connecting portion 51 until it has been loosely fitted in the ring receiving portion 51b not shown in FIG. 8A.

Figure 8A:
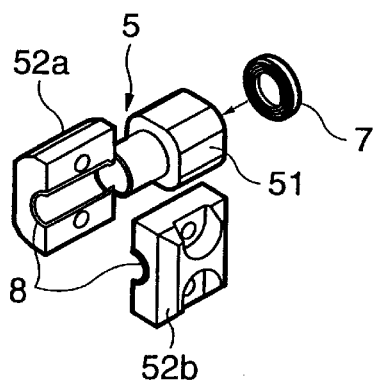
FIGS. 8A, 8B, 8C, 8D and 8E demonstrate a sequence of steps for assembling the structure of the first embodiment.
Figure 8B:
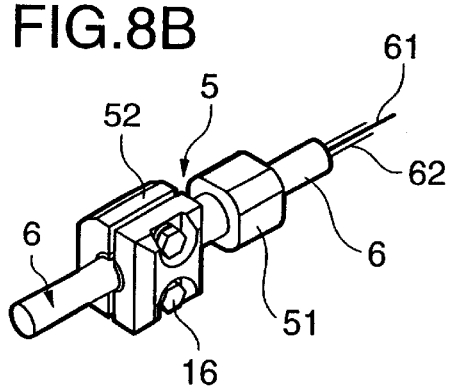

As shown in FIG. 8B, the cable 6 is inserted between the clamp support 52a and the clamp plate 52b and then temporarily fastened by the bolts 16. That is, the ring nut assembly 5 is temporarily affixed to the cable 6.

Figure 7:
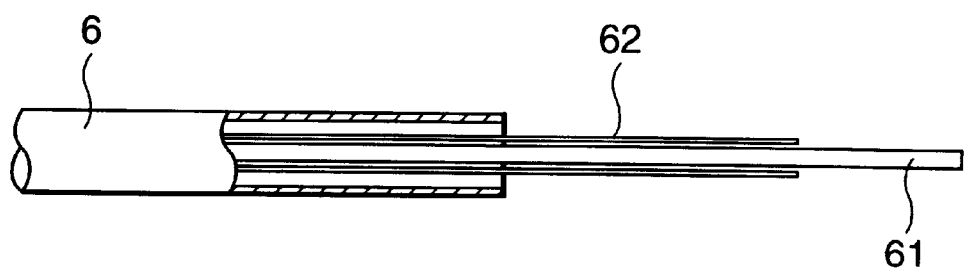
FIG. 7 is a section showing an optical cable applicable to the present invention.
Figure 8C:
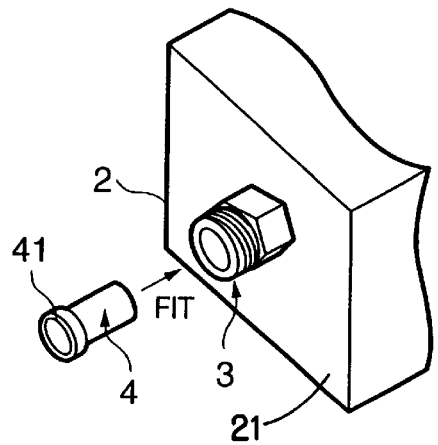

As shown in FIG. 7, the cable 6 with the ring nut assembly 5 temporarily affixed thereto has its end stripped so as to bare optical fibers 62 and the tension member 61 over a preselected length. Subsequently, as shown in FIG. 8C, the case 4 is mounted to the adapter 3 affixed to the sidewall 21 of the casing 2 beforehand.

Figure 8D:
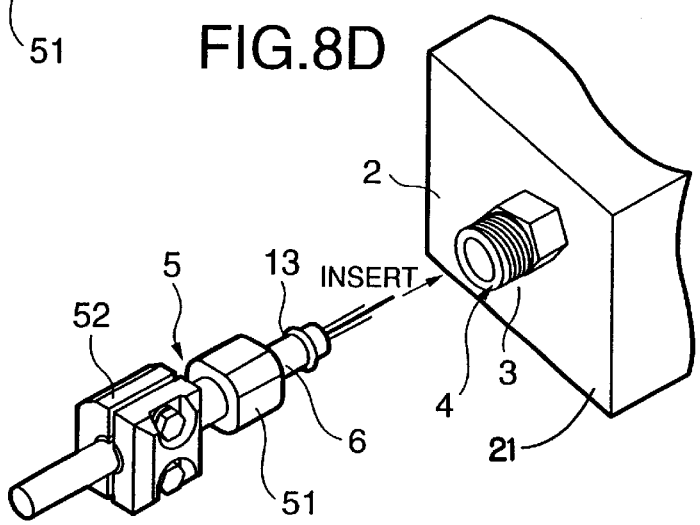

As shown in FIG. 8D, the third O-ring 13 is coupled over the cable 6 having been temporarily affixed to the ring nut assembly 5 and is then inserted into the case 4. The O-ring 13 prevents water from entering the case 4 via the cable 5. Specifically, the cable 6 is inserted into the case 4 until it abuts against the cable stopper 44. At the same time, the fibers 62 and tension member 61 are passed through the hole 44a of the cable stopper 44.

Subsequently, as shown in FIG. 2, the tension member 61 is held between the metal piece 14 and plate 14a of the tension member affixing portion 46 and then fixed in place by the bolt 15. This surely prevents the cable 6 from slipping out when pulled away from the casing 2.

Figure 8E:
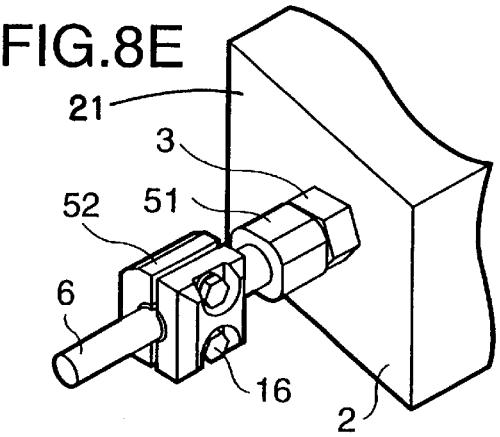

As shown in FIG. 8E, the ring nut assembly 5 is screwed into the adapter 3. Then, the bolts are fully tightened in order to affix the assembly 5 to the cable 6. As a result, as shown in FIG. 2, the ring 7 loosely fitted in the assembly 5 presses the third O-ring 13 against the wall of the tapered groove 45 of the case 4, stopping the gap between the O-ring 13 and the tapered groove 45 against the entry of water. Further, the assembly 5 absorbs extraneous forces apt to act on the cable 6 and thereby frees the fiber connecting portion from the influence of extraneous forces. Thereafter, as shown in FIG. 2, a sealing material 47 is filled in the second space 42b of the case 4 for a waterproofing purpose. The seal material 47 is implemented by epoxy resin or acrylic resin.

As stated above, the illustrative embodiment provides the individual structural element and between the structural elements a waterproof configuration. Further, the illustrative embodiment accommodates an optical cable having any desired outside diameter only if a small number of structural elements including the case 4, ring 7 and packing 8 are replaced. In addition, the above structure is not susceptible to extraneous forces apt to act on the cable at all.

Figure 9:
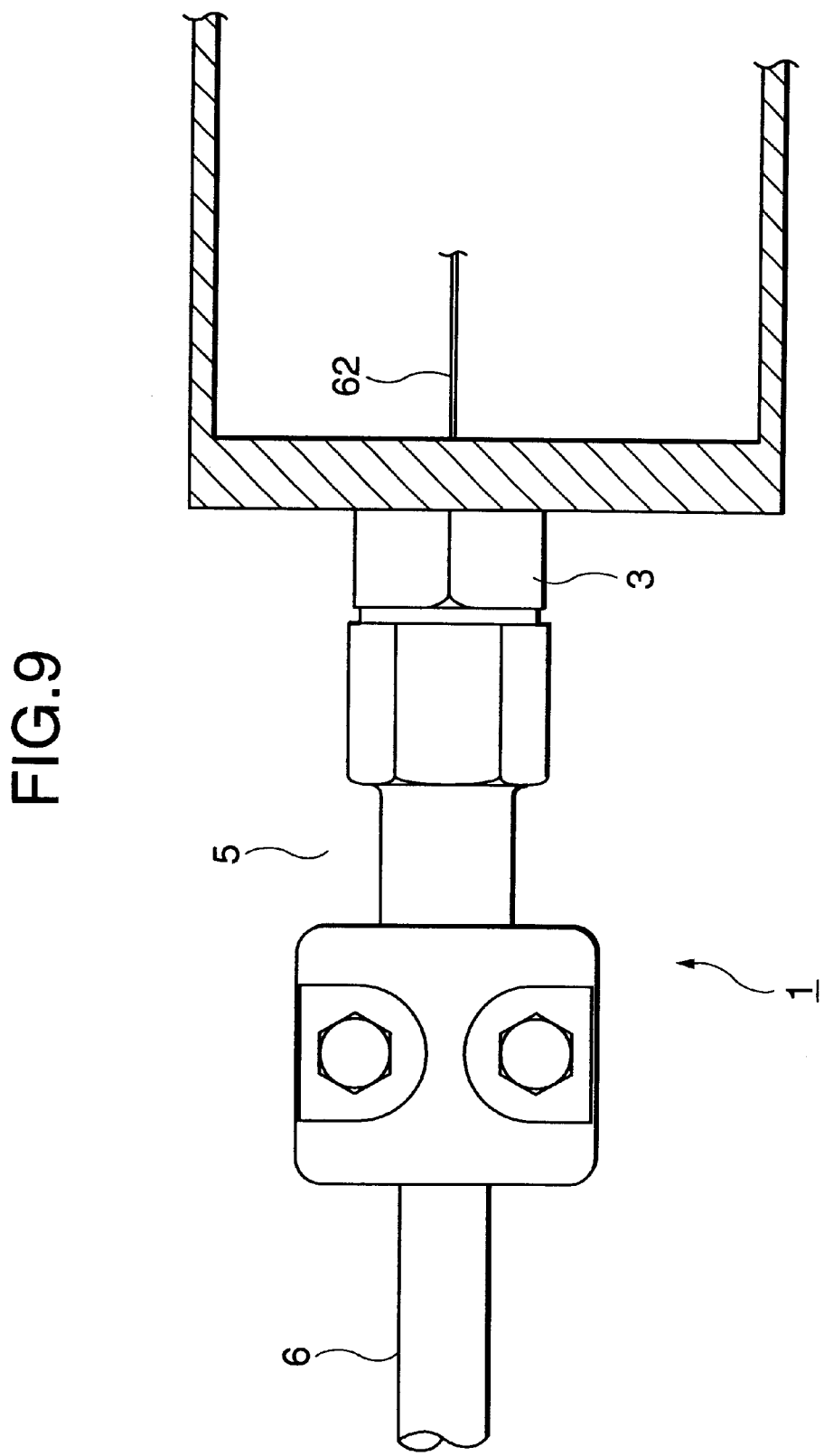
FIG. 9 is a front view showing a second embodiment of the present invention.
Figure 10:
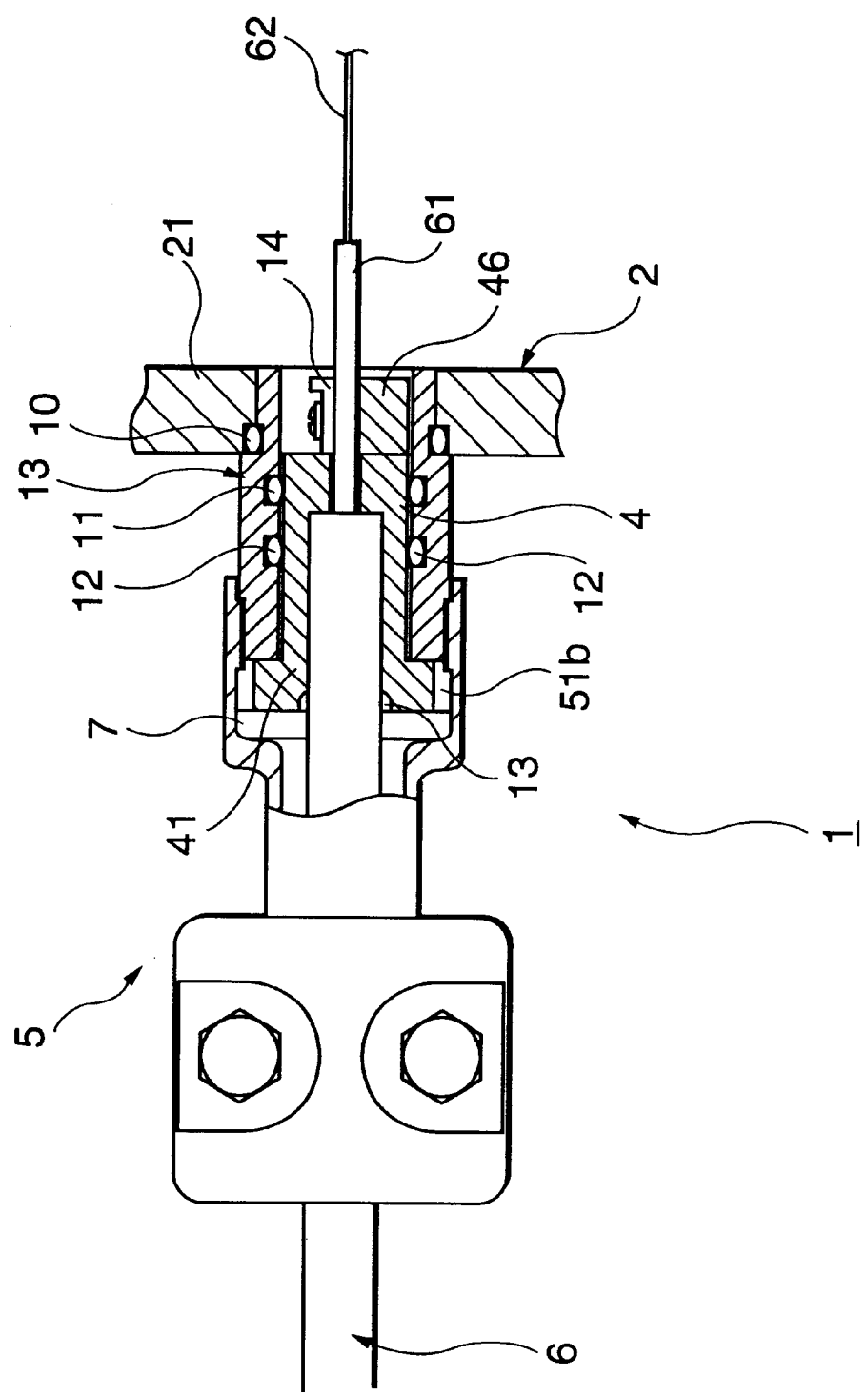
FIG. 10 is a section showing the second embodiment mounted to the casing of a communication apparatus.
Figure 11:
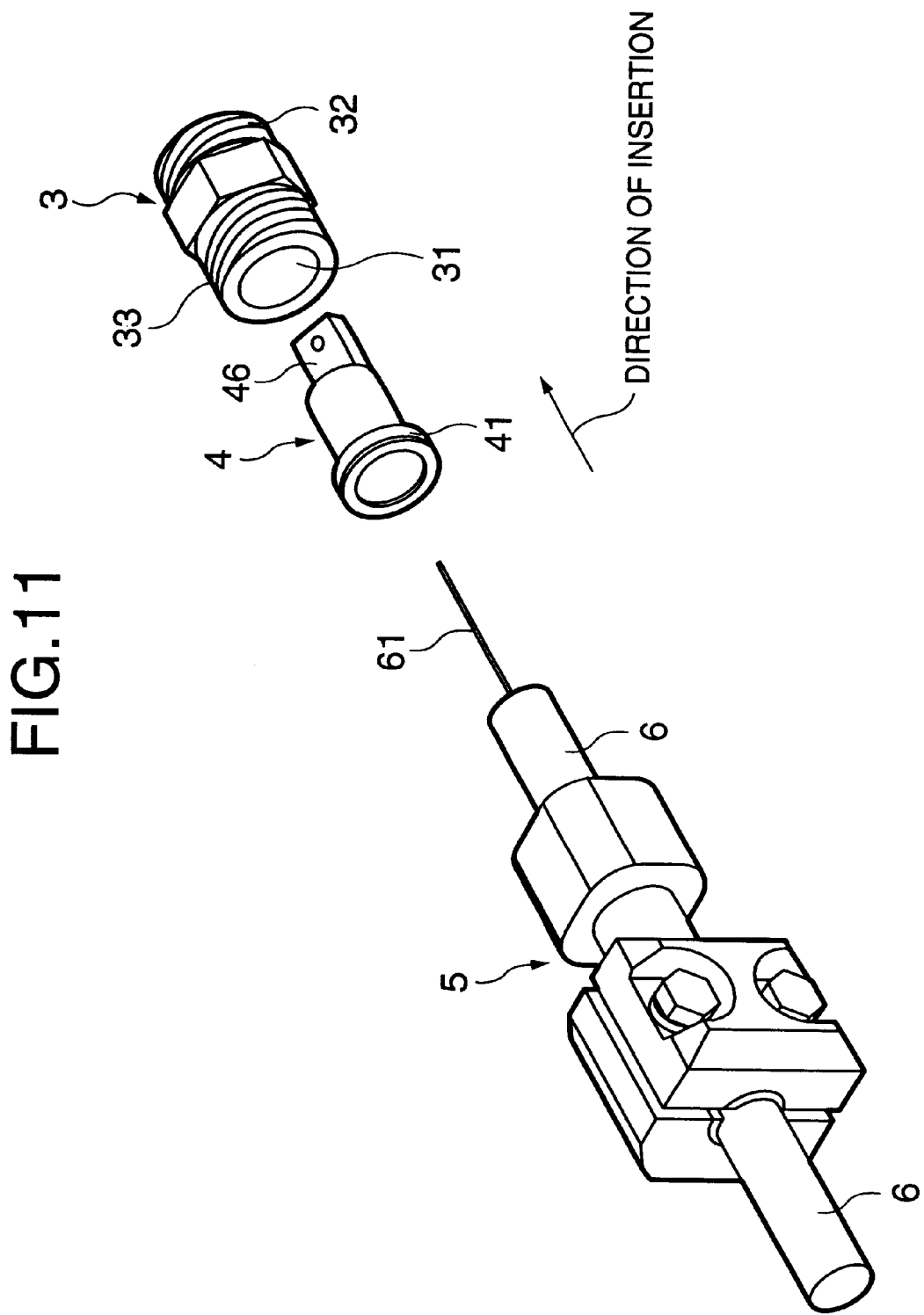
FIG. 11 is an exploded perspective view showing three basic structural elements, i.e., an adapter, a case assembly and a ring nut assembly constituting the second embodiment.

Referring to FIGS. 9–11, a second embodiment of the present invention will be described. As shown, an optical cable introducing structure, generally 1, includes an adapter 3 removably screwed into the casing 2. A case assembly 4 is removably received in a bore 31 axially extending throughout the center of the adapter 3. A ring nut assembly 5 is held in threaded engagement with the outer periphery of the adapter 3 in such a manner as to cover the flange 41 of the case assembly 4 and the adapter 3.

Figure 12:
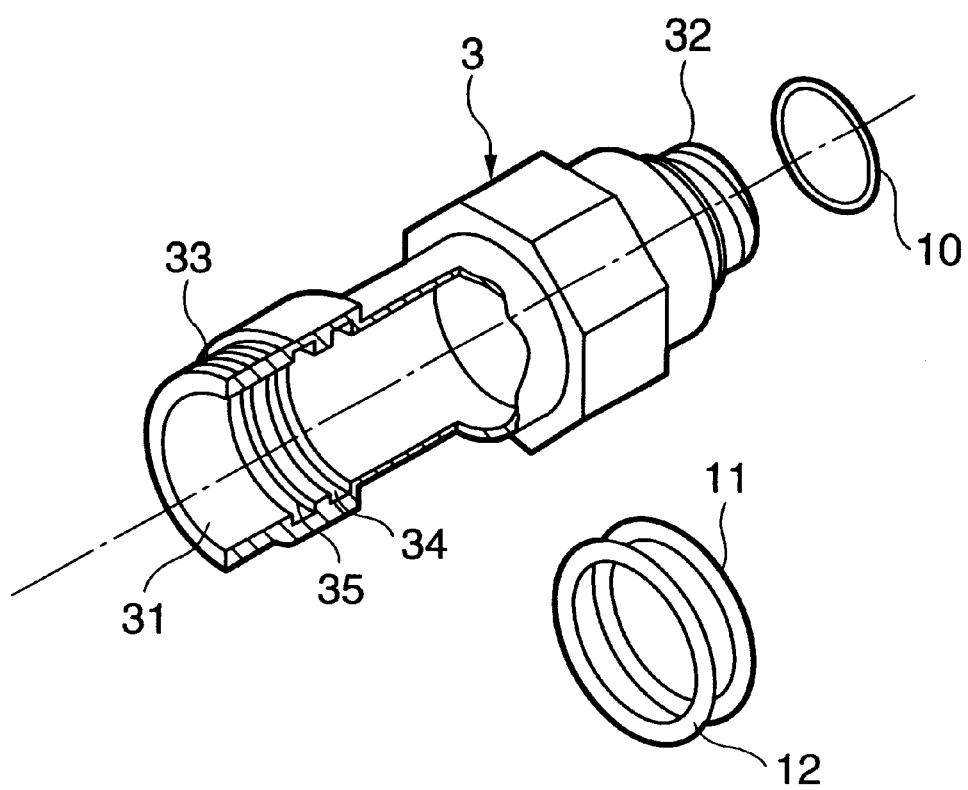
FIG. 12 is an exploded perspective view showing the adapter of the second embodiment in detail.

FIG. 12 shows the adapter 3 in detail. As shown, the adapter 3 is identical with the adapter 3 of the first embodiment and includes the through hole 31 for receiving the case assembly 4, and the first and second connecting portions 32 and 33. The first connecting portion 32 is screwed into the sidewall 21 of the casing 2 with the intermediary of the first O-ring 10 that plays the role of a waterproof member. The second connecting portion 33 is screwed into the ring nut assembly 5. A desired number of adapters 3 each having the above configuration are connected to the side wall 21 beforehand.

Figure 13A:
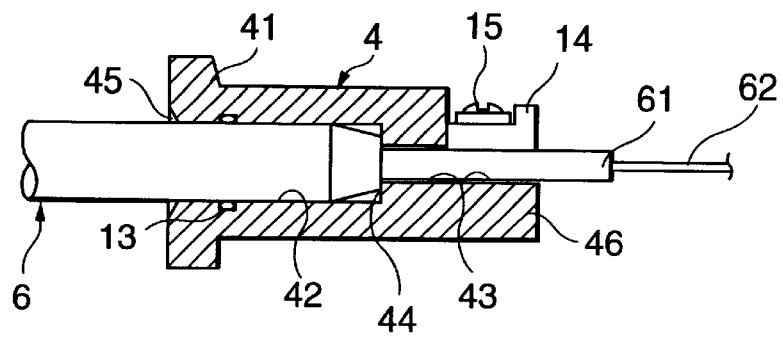
FIGS. 13A, 13B and 13C are respectively a section, an exploded perspective view and a perspective view showing the case assembly of the second embodiment in detail.
Figure 13B:
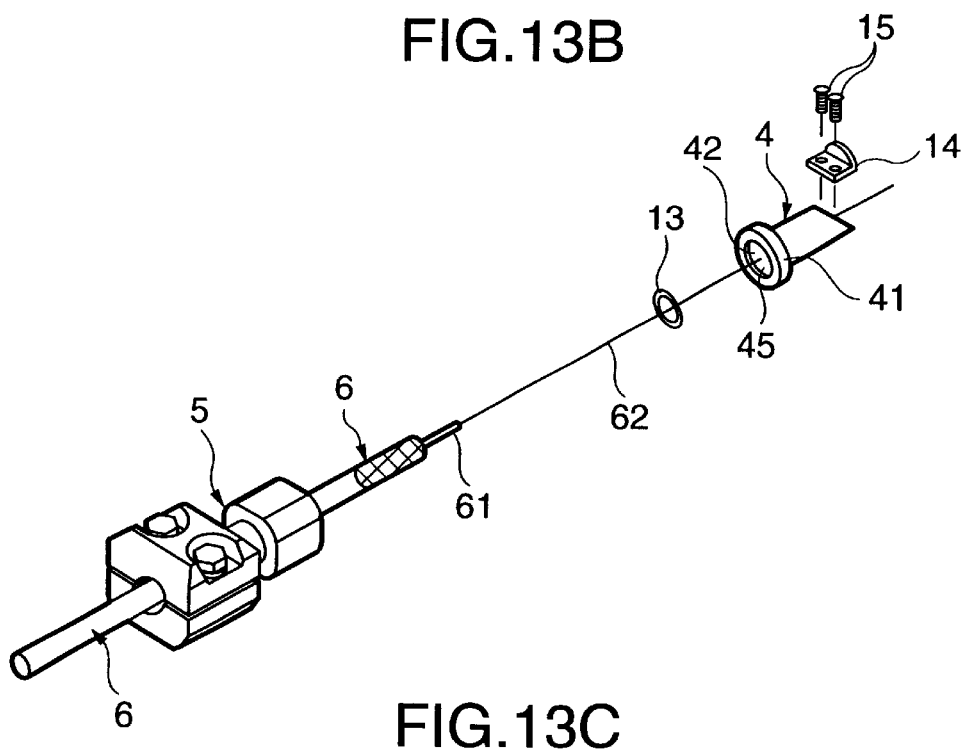
Figure 13C:
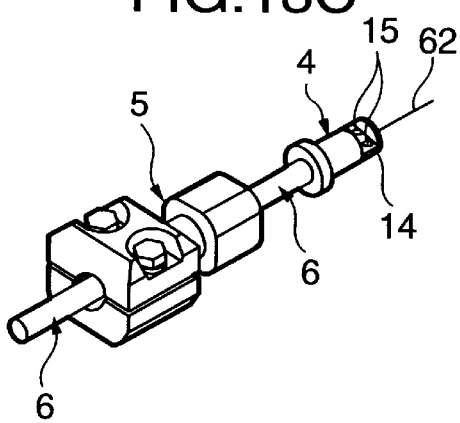

FIGS. 13A–13C show the case assembly 4 in detail. As shown, the case assembly 4 has the flange 41 at its one end. An axial bore 42 is formed at the center of the case assembly 4 for receiving the cable 6. O-rings 34 and 35 for waterproofing are respectively received in grooves 34 and 35 formed in the wall of the hole 31 of the adapter 3. The case assembly 4 is removably received in the hole 31 via the O-rings 11 and 12 (see FIG. 12).

Figure 14:
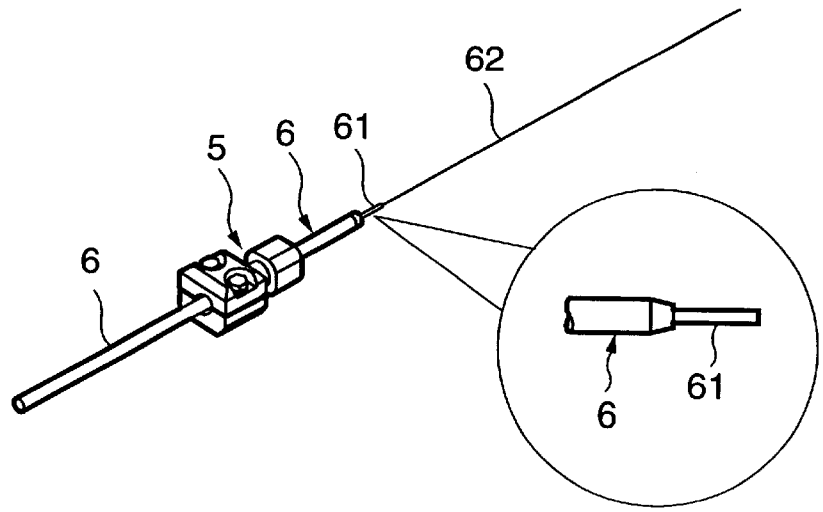
FIG. 14 is a perspective view showing how the end of an optical cable is configured.

FIG. 14 shows the cable 6 having a stripped end. As shown in FIG. 13A, the case assembly 4 includes a center hole 43 for receiving the tension member 61 of the cable 6. The bore 42 and center hole 43 are communicated to each other. A stopper 44 is formed between the bore 42 and the center hole 43 in order to stop the end of the cable 6 inserted into the bore 42. When the case assembly 4 is inserted into the adapter 3, the shoulder of the flange 41 abuts against the end of the second connecting portion 33 and prevents the assembly 4 from moving inward, i.e., toward the casing 2 any further.

As shown in FIGS. 13A–13C, a tapered annular groove 45 is formed in the wall of the inlet of the bore 42. When an adapter connecting portion 51 included in the ring nut assembly 5, which will be described later, is connected to the second coupling portion 33 of the adapter 3, the third O-ring 13 is received in the tapered groove 45. In this condition, the O-ring 13 closely contacts the case assembly 4 and cable 6 for a waterproofing purpose.

A tension member affixing portion 46 is formed at the other end of the case assembly 4 remote from the flange 41 and constitutes one of major features of this embodiment. The tension member 61 extending out from the cable 6, as shown in FIG. 14, is inserted into the bore 42 of the case assembly 4 and positioned by the stopper 44. The tension member affixing portion 46 affixes the tension member 61 with a metal piece 14 and screws 15. As shown in FIG. 10, in the illustrative embodiment, the affixing portion 46 is positioned outside of the casing 2.

The case assembly 4 has an inside diameter matching with the outside diameter of the cable 6 used. However, the outside diameter of the case assembly 4 is constant without regard to the outside diameter of the cable 6 used and slightly smaller than the inside diameter of the hole 31, as in the first embodiment.

Why the case assembly 4 is positioned between the adapter 3 and the ring nut assembly 5 is mainly as follows. At the present stage of development, the outside diameter of an optical cable depends on the manufacturer and on the kind of the cable. The case assembly 4 can easily adapt itself to the outside diameter of an optical cable used at the time of setting only if it is replaceable. This is also true when the existing optical cable is replaced with another optical cable having a different outside diameter.

Specifically, it is a common practice to replace all the basic structural elements when the outside diameter of an optical cable is changed. In the illustrative embodiment, a plurality of case assemblies 4 each having a bore 42 of particular diameter should only be prepared and selectively used in accordance with the outside diameter of the cable 6. Of course, the third O-ring 13 is replaced in accordance with the outside diameter of the cable 6 along with the case assembly 4. This is also true with a ring 7, which will be described later, loosely fitted in the adapter connecting portion 51 of the ring nut assembly 5 and a packing 8 or 9 included in a second cable affixing portion 52.

Figure 15:
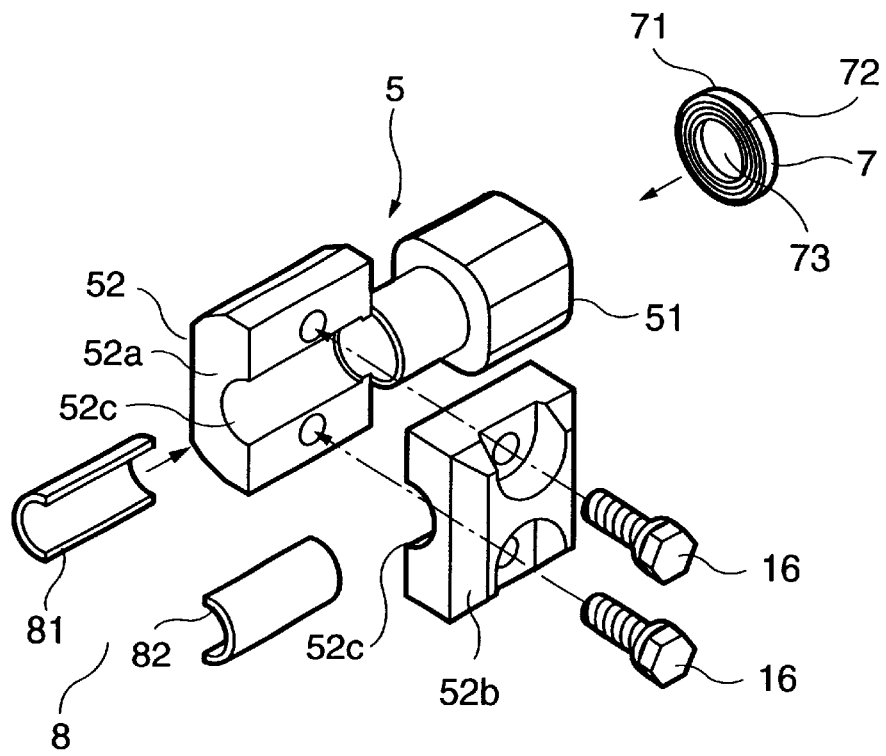
FIG. 15 is an exploded perspective view showing the ring nut assembly of the second embodiment in detail.

As shown in FIG. 15 in detail, the ring nut assembly 5 is identical with the ring nut assembly 5 of the first embodiment. Specifically, the assembly 5 includes the adapter connecting portion 51 to be connected to the second connecting portion 33 of the adapter 3, and the cable holding portion or second cable affixing portion 52 for holding the cable 6.

The female screw 51a is formed in the inner wall of the adapter connecting portion 51 in such a manner as to mate with the male screw of the second connecting portion 33 of the adapter 3. The ring receiving portion 51b, FIGS. 10 and 6B, is formed at the end of the female screw 51a for receiving the ring 7. The male screw 72 is formed in the outer circumference 71 of the ring 7, as in the first embodiment. The ring 7 is driven into the adapter connecting portion 51 with the male screw 72 mating with the female screw 51a. As soon as the male screw 72 moves over the female screw 51a, the ring 7 enters the ring storing portion 51b.

Because the outside diameter of the ring 7 is slightly smaller than the inside diameter of the ring receiving portion 51a, the former 7 is loosely fitted in the latter and slightly movable in the axial direction. The hole 73 is formed at the center of the ring 7. A plurality of rings 7 each having a hole 73 of particular diameter are prepared and selectively used in accordance with the outside diameter of the cable 6 used.

Specifically, a ring 7 whose inside diameter matches with the outside diameter of the cable 6 is used together with the case assembly 4. To replace the ring 7, it is necessary to remove the ring 7 from the ring receiving portion 51b. This can beeasily done by inserting the ends of a pincette-like jig or similar jig, not shown, into holes 7a (see FIG. 17) formed in the ring 7. The ring 7 can be inserted into the ring holding portion 51b in the same manner.

The cable holding portion 52 of the ring nut assembly 5 includes a clamp support 52a and a clamp plate 52b. The clamp support 52a is formed with an axial groove 52c having a semicircular cross-section. Likewise, the clamp plate 52b is formed with an axial groove 52c having a semicircular cross-section. When the clamp support 52a and clamp plate 52b are joined together, the grooves 52c form a single bore having a circular cross-section and communicated to the ring storing portion 51b of the adapter connecting portion 51.

A first and a second packing piece 81 and 82 are respectively received in the grooves 52c and constitute an exclusive packing 8 in combination. The cable 6 is inserted between the packing pieces 81 and 82. If desired, the exclusive packing 8 may be replaced with the general-purpose packing 9 shown in FIG. 6C. A plurality of exclusive packings 8 each matching with the outside diameter of an optical cable 6 are prepared and selectively used in accordance with the outside diameter of the cable 6.

After the packing 8 or 9 has been positioned in the cable holding portion or second cable holding portion 52, the cable 6 is inserted into the hole formed by the packing 8 or 9. Then, the clamp support 52a and clamp plate 52b are fastened together by the bolts 16. As a result, the cable 6 is affixed to the cable holding portion 52, as in the first embodiment.

The basic structural elements of the illustrative embodiment, i.e., adapter 3, case assembly 4 and ring nut assembly 5 should preferably be formed of brass, stainless steel, aluminum or similar metal or plastics. The ring 7, packing 8 or 9 and O-rings 11–13 should preferably be formed of nitric rubber, silicone rubber, fluorine rubber or similar elastic material.

A procedure for assembling the above structure 1 will be described hereinafter. First, the adapter 3 is screwed into the sidewall 21 of the casing 2 beforehand. At this instant, the first O-ring 10 intervenes between the adapter 3 and the sidewall 21 for a waterproofing purpose. Then, the case assembly 4 whose inside diameter matches with the outside diameter of the cable 6 used and the ring 7 and packing 8 or 9 to be received in the ring nut assembly 5 are prepared. The ring 7 and packing 8 or 9 are mounted to the ring nut assembly 5.

After the cable 6 has been passed through the ring nut assembly 5, the end of the cable 6 is provided with the configuration shown in FIG. 14. Specifically, the cable 6 is stripped in order to bare the tension member 61 and fibers 62 over a preselected length, and then the tension member 61 is cut.

Subsequently, the O-ring 13 between the case assembly 4 and the cable 6 is positioned in the tapered groove 45. Waterproofing the adapter 3 and case assembly 4 is implemented by the second O-rings 11 and 12 having already been mounted to the adapter 3.

The cable 6 with the stripped end is inserted into the case assembly 4. At this instant, the cable 6 abuts against the stopper 44 of the case 4 and is positioned thereby. The tension member 62 and fibers 52 are passed through the center hole 43 adjoining the stop 44. The tension member 62 is affixed to the tension member affixing portion 46 of the case assembly 4 by the metal piece 14 and screws 15.

In the above condition, the ring nut assembly 5 is affixed to the adapter 3 with its adapter connecting portion 51 mating with the second connecting portion 33 of the adapter 3. At this instant, the ring 7 loosely fitted in the adapter connecting portion 51 and receiving the cable 6 cooperates with the third O-ring 13 received in the tapered groove 45 to seal or waterproof the gap between the case assembly 4 and the cable 6 and ring nut assembly 5.

After the ring nut assembly 5 has been fastened to the adapter 3, the clamp plate 52b is fastened to the clamp support 52a by the bolts 16. As a result, the cable 6 is affixed between the clamp support 52a and the clamp plate 52b via the packing 8 or 9. This part of the structure 1 also serves to absorb extraneous forces apt to act on the cable 6.

Figure 16:
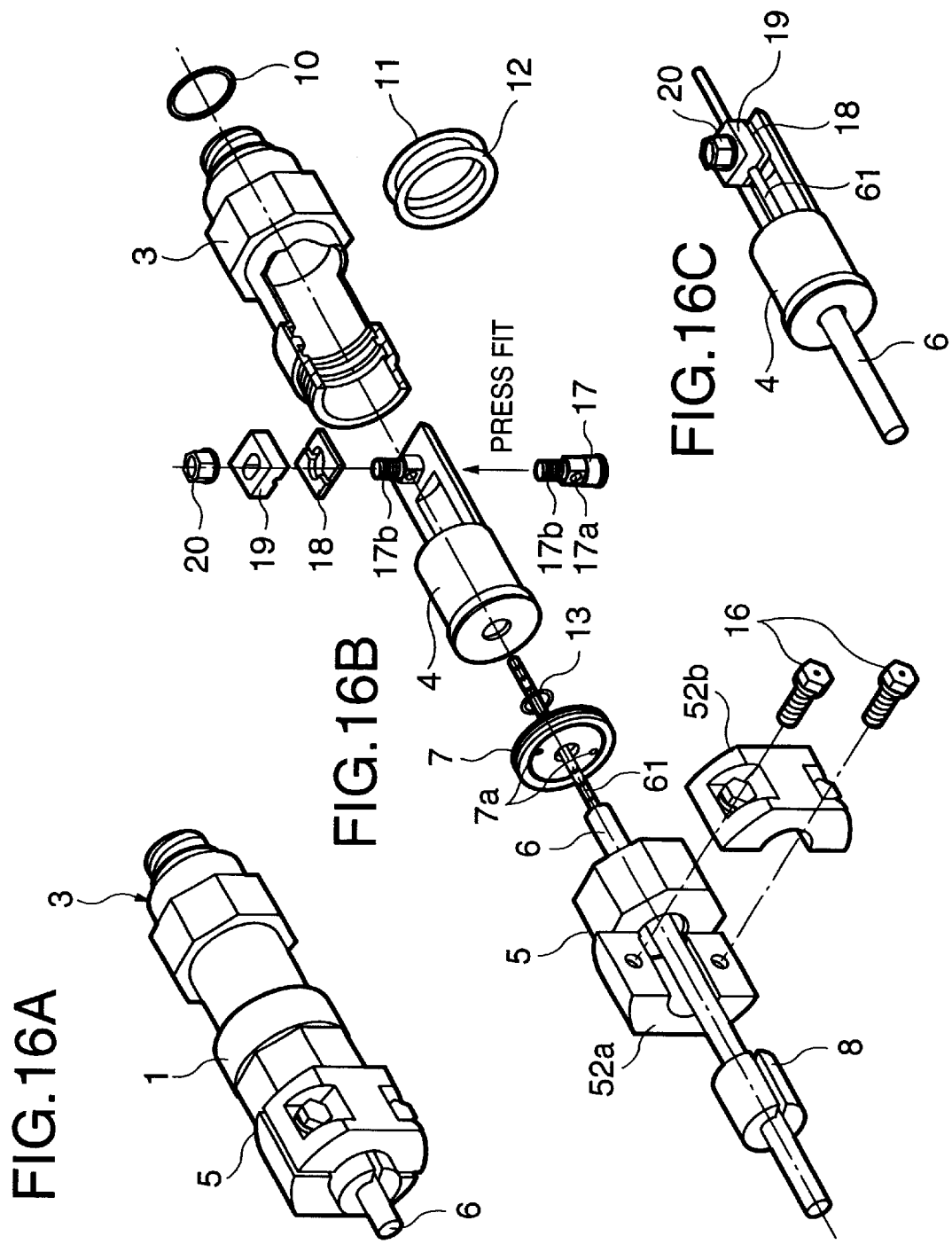
FIGS. 16A and 16B are perspective views showing a third embodiment of the present invention in an assembled condition and a disassembled condition, respectively.
FIG. 16C is a perspective view showing a case assembly included in the third embodiment in an assembled condition.

Reference will be made to FIGS. 16A–16C for describing a third embodiment of the present invention. This embodiment is applicable to a tension member having a tubular configuration. As shown, this embodiment is identical with the second embodiment except for the tension member affixing portion 46. A pin 17 is press fitted in the case assembly 4. The pin 17 has a through hole 17a for allowing the tension member 61 to be passed therethrough and a threaded portion 17b. Clamps 18 and 19 each is formed with a hole for passing the threaded portion 17b of the pin 17. After the pin 17 has been passed through the holes of the clamps 18 and 19, the clamp 19 is pressed against the clamp 18 by a nut 20. As a result, the tension member 61 positioned between the clamps 18 and 19 is pressed and firmly retained by the clamps 18 and 19.

Figure 17:
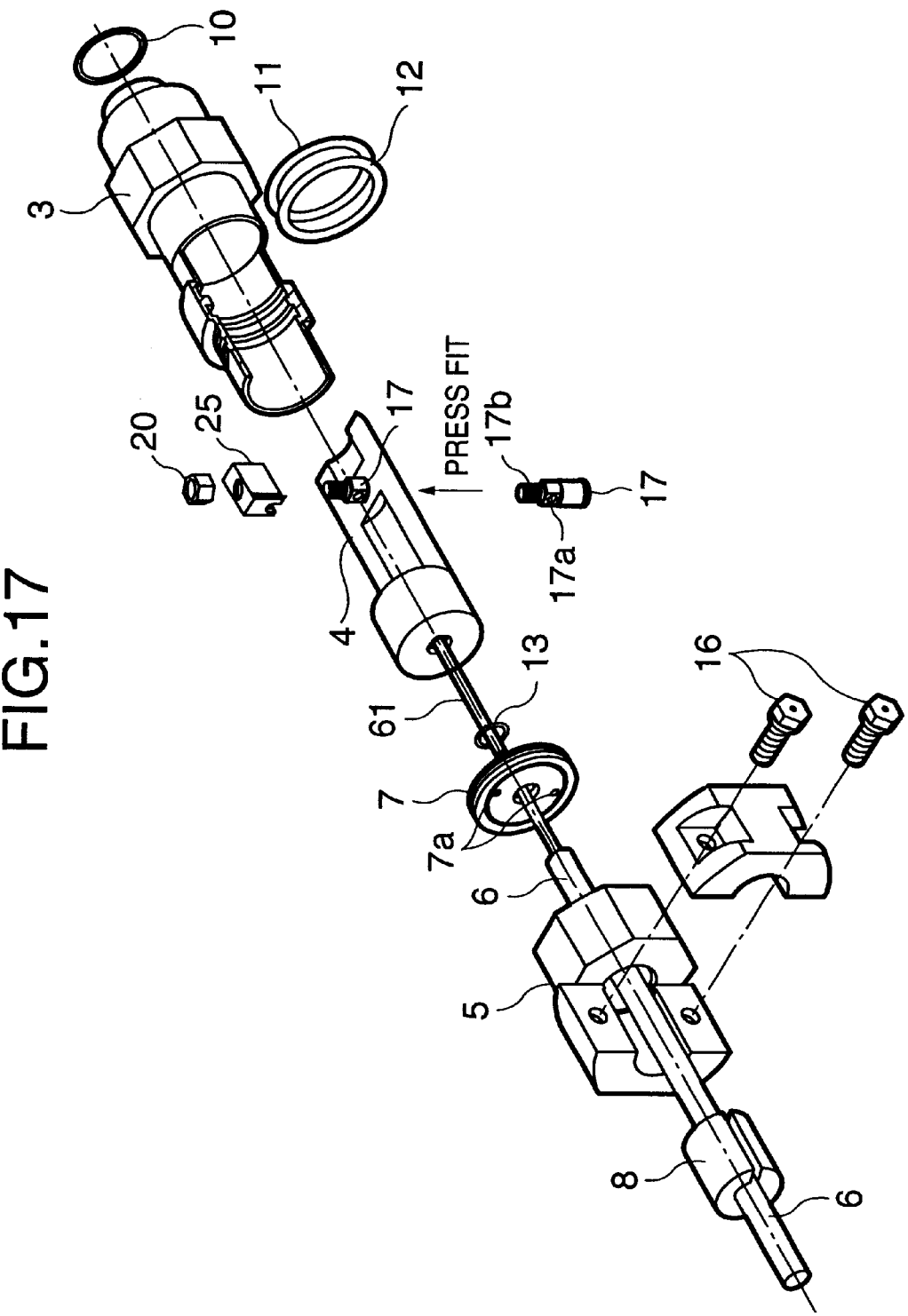
FIG. 17 is an exploded perspective view showing a fourth embodiment of the present invention.

FIG. 17 shows a fourth embodiment of the present invention that is a modification of the third embodiment. As shown, a clamp 25 is substituted for the clamp 19 of the third embodiment. The clamp 25 is desirable when the tension member 61 is implemented as a solid wire or a strand.

Figure 18:
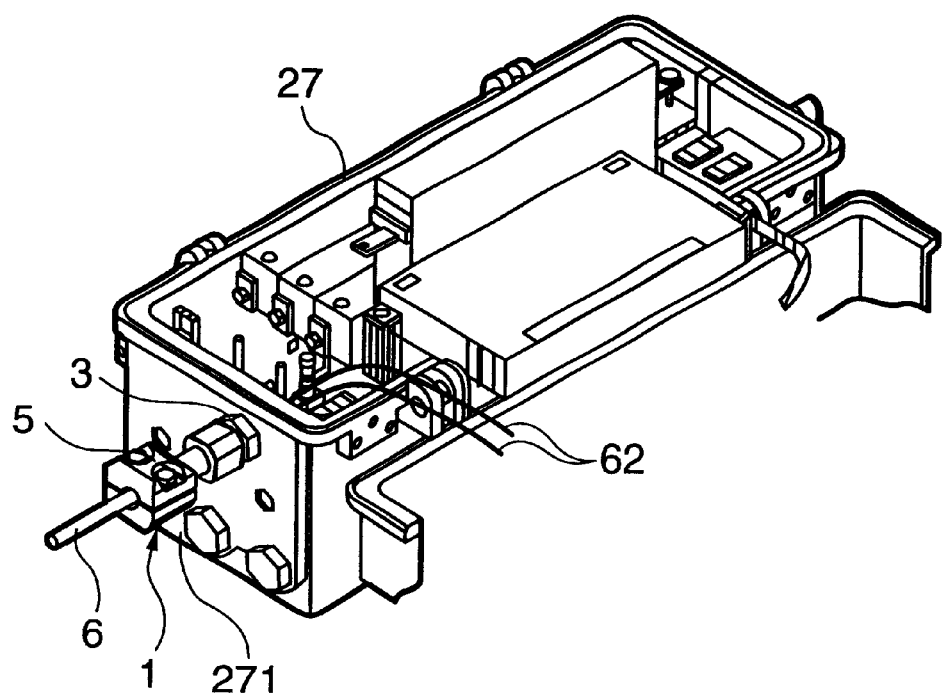
FIG. 18 is a perspective view showing a specific condition wherein the structure of the present invention is mounted to an outdoor communication apparatus.

FIG. 18 shows a specific outdoor communication apparatus to which any one of the illustrative embodiments is applicable. As shown, the communication apparatus has a casing 27 (2 in the illustrative embodiments) including a sidewall 271. The optical cable introducing structure 1 is mounted on the casing 27. The communication apparatus 27 may be, e.g., a repeating amplifier included in a CATV (Cable Television) system or an electronic apparatus or a communication apparatus situated on the ground or a pole or in a manhole by way of example.

In summary, it will be seen that the present invention provides an optical fiber introducing structure having various unprecedented advantages, as enumerated below.

(1) Only a tension member and optical fibers protruding from the body of an optical cable are introduced into a communication apparatus. The cable body is affixed to the apparatus by a ring nut assembly while the tension member is affixed by a tension member affixing portion disposed in the apparatus. The structure is therefore miniature and fully waterproof. Further, the structure can resist extraneous forces apt to act on the cable and can therefore protect the cable from breakage.

(2) The structure is capable of accommodating optical cables of different diameters only if structural elements relating to the outside diameter of a cable and not constituting the major part of the structure are replaced. Therefore, the structure has an optimal waterproofing ability for the outside diameter of a cable used and is usable for a broad range of applications. In addition, the structure can be assembled by an identical procedure without regard to the outside diameter of a cable and needs no adjustment, obviating defective work ascribable to human errors. The structure can therefore be surely and easily assembled in a short period of time and is easy to maintain.

(3) When an optical cable introducing portion is positioned outside of the apparatus, adjustment for coping with a change in the outside diameter of the cable is accomplished only if a case assembly and a ring and a packing arranged in a ring nut assembly are replaced. The tension of the cable can be adjusted by a first and a second cable affixing portion included in the case assembly and ring nut assembly, respectively. This allows a tension member retaining mechanism to be positioned outside of the apparatus so as to obviate the conventional dead space. The structure therefore promotes the effective use of a limited space available in the apparatus and can support and waterproof the cable at the same time.

(4) To waterproof optical cables of different diameters with a single structure, it has been customary to insert a packing between an optical cable and a case assembly and then compress the case assembly so as to eliminate a gap between the cable and the packing. This, however, brings about a problem that the packing forcibly compressed creases and allows air or water to enter due to capillarity. In accordance with the present invention, the case assembly is replaceable in matching relation to the outside diameter of the cable and can be applied to another cable introducing portion. The other structural elements do not have to be replaced.

(5) The first and second cable affixing portions of the cable introducing portion located outside of the apparatus prevent the cable from being caught by accident after installation and free the cable from moments and twists ascribable to the weight of rain and snow or strong winds.

(6) In the above structure, the tension member of the cable is not introduced into the apparatus, making it needless to arrange a tension member affixing portion in the apparatus. It follows that the optical fibers can be configured and manipulated within the apparatus in the limited range of radius of curvature. This is particularly advantageous when the apparatus is small size and has only a limited mounting space therein.

(7) After the tension member has been affixed to the case assembly, the case assembly is mounted to the apparatus. This makes it needless to affix the tension member within the apparatus after mounting the structure to the apparatus and thereby noticeably simplifies the procedure for introducing the cable into the apparatus.

Various modifications will become possible for those skilled in the art after receiving the teachings of the present disclosure without departing from the scope thereof.

What is claimed is:

1. A structure for introducing an optical cable into a casing of a communication apparatus, characterized in that said optical cable is fixed in place at at least two positions, wherein the at least two positions being located outside of the casing and the cable being fixed in place at least one position by means for affixing the optical cable itself and at least another position by means for affixing a tension member included in said optical cable.

2. A structure as claimed in claim 1, characterized itn that the cable is fixed in place at at least one position by means for affixing the optical cable itself, and at at least another position by means for affixing a tension member included in said optical cable, wherein said structure is applied to an outdoor communication apparatus.

3. A structure as claimed in claim 1, characterized in that said case includes tension member affixing means for affixing a tension member included in the optical cable, and in that said case is implemented as a case assembly.

4. A structure for introducing an optical cable into a casing of a communication apparatus, characterized by comprising:
   an adapter to be mounted to the casing while holding the optical cable at a center thereof;
   a ring nut assembly connected to said adapter while holding the optical cable at a center thereof; and
   a case positioned between said ring nut assembly and said adapter.

5. A structure as claimed in claim 4, characterized in that said case is selected from a group of cases identical in outside diameter, but different in inside diameter, in accordance with an outside diameter of the optical cable.

6. A structure as claimed in claim 4, characterized in that said case includes tension member affixing means for affixing a tension member included in the optical cable, and in that said case is implemented as a case assembly.

7. A structure for introducing an optical cable into a casing of a communication apparatus, characterized in that tension member affixing means for affixing a tension member included in said optical cable is positioned outside of said casing.

8. A structure for introducing an optical cable having an end thereof stripped to bare optical fibers and a tension member over a preselected length into a casing of a communication apparatus, characterized by comprising:
   an adapter including a first connecting portion to be connected to the casing, a first O-ring for waterproofing said adapter and said casing, a second connecting portion, a receiving portion, and a plurality of second O-rings;
   a case received in said receiving portion of said adapter and waterproofed from said adapter by said plurality of second O-rings, said case including a cable stopper for positioning the optical cable and a third O-ring for intercepting water which may enter via a sheath of said optical cable;
   a ring nut assembly including a cable holding portion for holding the optical cable to be positioned by said cable stopper, and an adapter connecting portion into which said second connecting portion is screwed; and
   a tension member affixing portion for affixing the tension member of the optical cable.

9. A structure as claimed in claim 8, characterized in that said case is a hollow cylinder for allowing the optical cable to be inserted thereinto and capable of being received in said adapter, and comprises:
   a flange formed on an outer periphery of a first end of said hollow cylinder which is an inlet for the optical cable, for preventing said case from slipping out of said adapter;
   a cable stopper formed in an inner periphery of said hollow cylinder for dividing an inside of said hollow cylinder into a first space axially extending from said one end and a second space axially adjoining said first space, said cable stopper stopping the optical cable in said first space while allowing only optical fibers and a tension member protruding from said optical cable to enter said second space; and
   a third O-ring received in a tapered portion formed in said first end.

10. A structure as claimed in claim 8, characterized in that said cable holding portion and said adapter connecting portion of said ring nut assembly are constructed integrally with each other, in that said cable holding portion comprises a packing to be fitted on the optical cable, a clamp support and a clamp plate for sandwiching said optical cable therebetween, and bolts, in that said adapter connecting portion comprises a cable passing portion and a ring, in that said cable passing portion is a hollow cylinder allowing the optical cable to be passed therethrough and includes a female screw formed in an inner periphery of a first end of said hollow cylinder for mating with said adapter, and a ring receiving portion adjoining said female screw for loosely receiving said ring, in that said ring is a disk and includes a hole formed at a center of said disk for allowing the optical cable to be passed therethrough, and a male screw formed in an outer periphery of said disk for mating with said female screw and being loosely received in said ring receiving portion, and in that said ring has a strength and a thickness great enough to press said third O-ring against said case when said adapter connecting portion is screwed into said adapter.

11. A structure as claimed in claim 10, characterized in that said ring is loosely fitted in said ring receiving portion.

12. A structure as claimed in claim 10, characterized in that said ring receiving portion includes a wall for causing said ring to press said third O-ring against said case when said adapter connecting portion is screwed into said adapter.

13. A structure as claimed in claim 10, characterized in that said adapter connecting portion is formed in an outer periphery of a first end of said cable passing portion and includes a polygonal portion for facilitating screwing of said adapter connecting portion into said adapter.

14. A structure as claimed in claim 10, characterized in that said packing comprises either one of an exclusive packing and a general-purpose packing.

15. A structure as claimed in claim 14, characterized in that said exclusive packing comprises a first and a second packing piece produced by axially bisecting a cylinder having an inside diameter matching with an outside diameter of the optical cable.

16. A structure as claimed in claim 14, characterized in that said general-purpose packing comprises a hollow cylinder formed with an axial slit for fitting said general-purpose packing on the optical cable, in that said general-purpose packing has a plurality of stepwise inside diameters contiguous in an axial direction of said hollow cylinder, in that said hollow cylinder is formed with circumferential slits at positions where said plurality of inside diameters join each other, and in that said general-purpose packing is capable of being cut off at any one of said circumferential slits in order to implement an inside diameter matching with an outside diameter of the optical cable.

17. A structure as claimed in claim 8, characterized in that said ring nut assembly, said case and said adapter each is formed of either one of metal and plastic.

18. A structure as claimed in claim 17, characterized in that the metal comprises one of brass, stainless steel, and aluminum.

19. A structure as claimed in claim 8, characterized in that said adapter is a hollow cylinder capable of accommodating said case and comprises:
- a first male screw formed in an outer periphery of said first end for mating with said ring nut assembly;
- a second male screw formed in an outer periphery of a second end of said hollow cylinder and screwed into the casing;
- a first O-ring received in a groove adjoining said second male screw;
- a plurality of second O-rings respectively received in grooves formed in an inner periphery of said hollow cylinder; and
- a polygonal portion positioned at a center of the outer periphery of said hollow cylinder for facilitating screwing of said adapter into the casing.

20. A structure as claimed in claim 8, characterized in that said first O-ring, said second O-rings and said third O-ring are formed of an elastic material.

21. A structure as claimed in claim 20, characterized in that the elastic material comprises one of nitric rubber, silicone rubber and fluorine rubber.

22. A structure as claimed in claim 8, characterized in that said second space is filled with a sealer implemented by either one of epoxy resin and aryl resin.

23. A structure for introducing an optical cable into a casing of a communication apparatus, comprising:
- an adapter affixed to a side wall of the casing via a first O-ring and formed with a first axial through hole at a center thereof;
- a case assembly including a flange engageable with an outer end of said adapter and a second axial through hole formed at a center, said case assembly being inserted into said first through hole via a second O-ring and further including a stop engageable with an end of the optical cable and first cable affixing means for affixing said optical cable; and
- a ring nut assembly formed with a third axial through hole for passing the optical cable at a center thereof and affixed to said adapter while covering said flange, said ring nut assembly including second cable affixing means for affixing said optical cable;
- said first optical cable affixing means being positioned outside of the casing.

24. A structure as claimed in claim 23, characterized in that said first cable affixing means comprises tension member affixing means for affixing a tension member included in the optical cable.

25. A structure as claimed in claim 23, characterized in that said adapter, said case assembly and said ring nut assembly are respectively removably mounted to the casing, said first through hole and said outer end of said adapter.

26. A structure as claimed in claim 23, characterized in that said stop is formed with a hole at a center thereof coaxially with said second through hole for passing optical fibers and a tension member of the optical cable therethrough.

27. A structure as claimed in claim 24, characterized in that said tension member affixing means is positioned at an end of said case assembly opposite to said flange.

28. A structure as claimed in any one of claims 24–27, characterized in that said tension member affixing means is positioned in the sidewall of the casing.

29. A structure as claimed in claim 28, characterized in that said tension member affixing means comprises a metal piece for pressing the tension member at said end of said case assembly and a fastening member for fastening said metal piece.

30. A structure as claimed in any one of claims 24–27, characterized in that said tension member affixing means comprises a metal piece for pressing the tension member at said end of said case assembly and a fastening member for fastening said metal piece.

31. A structure as claimed in claim 24, characterized in that after said tension member has been affixed by said tension member affixing means, said case assembly is mounted to said adapter.

32. A structure as claimed in claim 23, characterized in that said case assembly comprises a plurality of case assemblies different in an inside diameter of said second through hole from each other and selectively used in accordance with the outside diameter of the optical cable.

33. A structure as claimed in claim 23, characterized in that said ring nut assembly comprises adapter connecting means to be connected to said adapter and second cable affixing means for affixing the optical cable and made up of a first and a second cable holding portion.

34. A structure as claimed in claim 33, characterized in that said first and second cable holding portions are respectively formed with an axial first and an axial second groove each having a semicircular cross-section at centers thereof, in that the first and second grooves form a circular through bore when said first and second cable holding portions are combined, in that said through bore is communicated to an axial through hole formed at a center of said adapter connecting means to thereby form said third through hole, and in that a first and a second piece of an exclusive packing or a general-purpose packing selected in accordance with an outside diameter of the optical cable are respectively fitted in said first and second grooves for receiving the optical cable.

35. A structure as claimed in any one of claims 23, 33 and 34, characterized in that a ring is loosely fitted in a ring receiving portion formed in said through hole of said adapter connecting means.

36. A method of introducing and connecting an optical cable to a casing of a communication apparatus, characterized by comprising the steps of:

fitting an exclusive packing matching with an outside diameter of the optical cable on a clamp support and a clamp plate, and loosely fitting a ring matching with the outside diameter of said optical cable in a ring receiving portion to thereby prepare for assembly of a ring nut assembly;

passing the optical cable through a cable passing portion of said ring nut assembly prepared, positioning said optical cable between said clamp support and said clamp plate, and temporarily fastening said clamp support and said clamp plate with bolts;

stripping an end of the optical cable temporarily holding said ring nut assembly over a preselected length to thereby bare optical fibers and a tension member;

mounting a case to an adapter screwed into the casing beforehand;

coupling a third O-ring over the optical cable temporarily holding said ring nut assembly and having the stripped end;

inserting the optical cable into said case until said optical cable abuts against a cable stopper formed in said case to thereby position said optical cable, while passing the optical fibers and the tension member through a hole formed in said cable stopper;

affixing the tension member with a tension member affixing portion disposed in the casing; and connecting said ring nut assembly and said adapter by screwing, and tightly fastening said bolts of said ring nut assembly to thereby affix said ring nut assembly to the optical cable.

37. A method as claimed in claim 36, characterized in that a general-purpose packing is cut off in matching relation to an outside diameter of the optical cable and fitted on said optical cable.

38. A method as claimed in claim 36, characterized in that said ring nut assembly and said adapter are connected by screwing such that said ring presses said third O-ring against said case.

39. A method of introducing and connecting an optical cable to a casing of a communication apparatus, characterized by comprising the steps of:

fitting an exclusive packing matching with an outside diameter of the optical cable on a clamp support and a clamp plate, and loosely fitting a ring matching with the outside diameter of said optical cable in a ring receiving portion to thereby prepare for an assembly of a ring nut assembly;

passing the optical cable through a cable passing portion of said ring nut assembly prepared, positioning said optical cable between said clamp support and said clamp plate, and temporarily fastening said clamp support and said clamp plate with bolts;

stripping an end of the optical cable temporarily holding said ring nut assembly over a preselected length to thereby bare optical fibers and a tension member;

selectively preparing a case assembly matching with an outside diameter with the optical cable;

inserting the optical cable into said case assembly until said cable abuts against a cable stopper formed in said case assembly to thereby position said optical cable, while passing the optical fibers and the tension member through a hole formed in said cable stopper;

affixing the tension member with the stripped end with tension member affixing means formed in said case assembly;

mounting said case assembly holding the tension member to an adapter screwed into the casing beforehand;

coupling a third O-ring over the optical cable temporarily holding said ring nut assembly and having the tension member affixed thereto; and connecting said ring nut assembly and said adapter by screwing, and tightly fastening said bolts of said ring nut assembly to thereby affix said ring nut assembly to the optical cable.

40. A method as claimed in claim 39, characterized in that a general-purpose packing is cut off in matching relation to an outside diameter of the optical cable and fitted on said optical cable.

41. A method as claimed in claim 39, characterized in that said ring nut assembly and said adapter are connected by screwing such that said ring presses said third O-ring against said case.

\* \* \* \* \*